US006231035B1

(12) United States Patent
De Graaff et al.

(10) Patent No.: US 6,231,035 B1
(45) Date of Patent: May 15, 2001

(54) WORKPIECE FIXTURE

(75) Inventors: Willem T. De Graaff, Albuquerque; Allen L. Kelly, Las Cruces, both of NM (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/432,790

(22) Filed: Nov. 3, 1999

(51) Int. Cl.[7] .......... B23Q 7/00
(52) U.S. Cl. .......... 269/32; 269/134
(58) Field of Search .......... 269/257, 134, 269/277, 278, 25, 224, 32

(56) References Cited

U.S. PATENT DOCUMENTS 4,558,856 * 12/1985 Shaffer .......... 269/277
4,901,990 * 2/1990 Frechette .......... 269/25
5,312,094 * 5/1994 Zera .......... 269/257

* cited by examiner

*Primary Examiner*—Robert C. Watson
(74) *Attorney, Agent, or Firm*—Andrew C. Hess; Gerry S. Gressel

(57) ABSTRACT

A fixture for holding a workpiece in a predetermined position during a manufacturing operation. The fixture includes a support having a surface for receiving the workpiece. The surface has a reference point for locating and orienting the workpiece in the predetermined position. The fixture also includes a clamp for clamping the workpiece in a fixed position with respect to the reference point to hold the workpiece in the predetermined position and a brace mounted on the support for bracing the workpiece to prevent the workpiece from deforming during the manufacturing operation. The brace has at least two jaws adapted for clamping the workpiece when received by the support to prevent movement of the workpiece toward or away from the support.

11 Claims, 2 Drawing Sheets

WORKPIECE FIXTURE

BACKGROUND OF THE INVENTION

The present invention relates generally to a fixture for holding a workpiece, and more particularly, to a fixture which firmly holds the workpiece without deforming or displacing the workpiece.

Fixtures are commonly used to hold workpieces in desired locations and orientations when performing manufacturing operations. Such fixtures generally include a support having one or more reference points which engage points on the workpiece for locating and orienting the workpiece. These fixtures also include one or more clamps for clamping the workpiece against the reference points to hold the workpiece in the predetermined position. Any workpiece movement can adversely affect the manufacturing operation. For instance, if the workpiece moves during a grinding operation, surfaces on the workpiece may be ground to an improper shape.

Even if the clamps firmly hold the workpiece against the reference points, the workpiece may still deform (i.e., flex) between the clamps and thereby affect the manufacturing operation. To prevent the workpiece from deforming, one or more braces are sometimes mounted on the support between the clamps. Frequently, these braces are retractable so they do not interfere with the workpiece when it is located on the reference points. The braces are retracted when the workpiece is positioned on the reference points and extended into position after the workpiece is clamped in place. However, due to variations in dimensions from workpiece to workpiece, the braces may not precisely meet the workpiece when extended. There may be gaps between the braces and the workpiece which permit the workpiece to deform during the manufacturing operation. Further, the brace may interfere with the workpiece as it is extended, causing the workpiece to deform. Therefore, unless the brace precisely meets the workpiece, the workpiece can deform and adversely affect the manufacturing operation.

SUMMARY OF THE INVENTION

Briefly, apparatus of this invention is a fixture for holding a workpiece in a predetermined position during a manufacturing operation. The fixture includes a support having a surface for receiving the workpiece. The surface has a reference point for locating and orienting the workpiece in the predetermined position. The fixture also includes a clamp for clamping the workpiece in a fixed position with respect to the reference point to hold the workpiece in the predetermined position and a brace mounted on the support for bracing the workpiece to prevent the workpiece from deforming during the manufacturing operation. The brace has at least two jaws adapted for clamping the workpiece when received by the support to prevent movement of the workpiece toward or away from the support. The jaws have a closed position in which the jaws are spaced apart a first distance sufficiently small to grip the workpiece and an open position in which the jaws are spaced apart a second distance sufficiently large to release the workpiece to permit the workpiece to be removed from the support. The brace is mounted on the support so as to permit at least one of the jaws to move generally parallel to the surface when moving from the open position to the closed position to compensate for geometric variation in the workpiece thereby permitting the brace to align itself to the workpiece and preventing the brace from moving the workpiece out of the predetermined position when the workpiece is clamped against the reference point. Further, the brace is mounted on the support so as to prevent the jaws from moving substantially normal to the surface to prevent the workpiece from moving toward or away from the support when the jaws are in the closed position.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
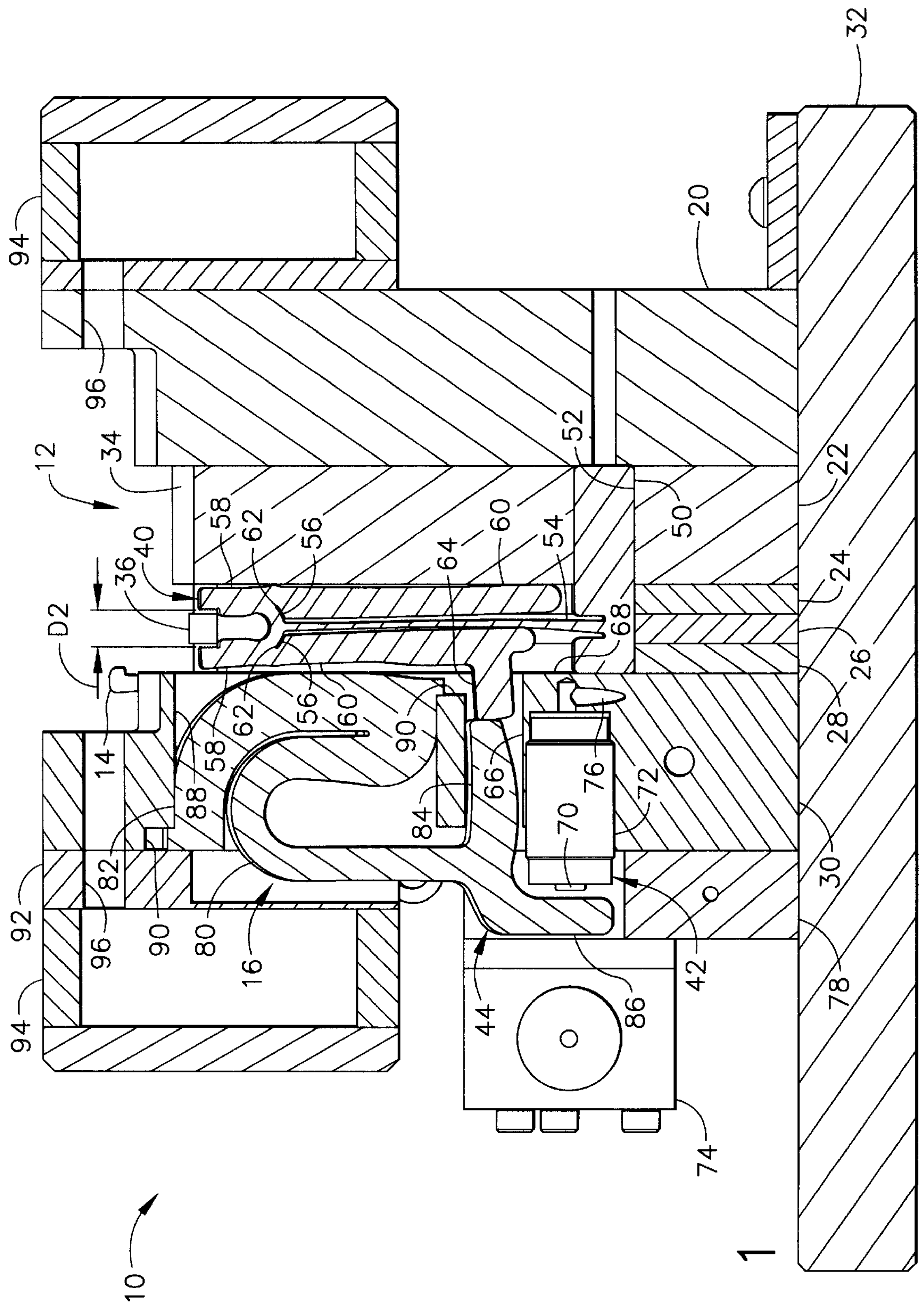
FIG. 1 is a vertical cross section taken through a fixture of the present invention showing jaws of a brace in an open position.

Referring now to the drawings and in particular to FIG. 1, a fixture of the preferred embodiment is designated in its entirety by the reference number 10. The fixture 10 comprises a support, generally designated by 12, a clamp 14 and a bracing system, generally designated by 16.

Figure 2:
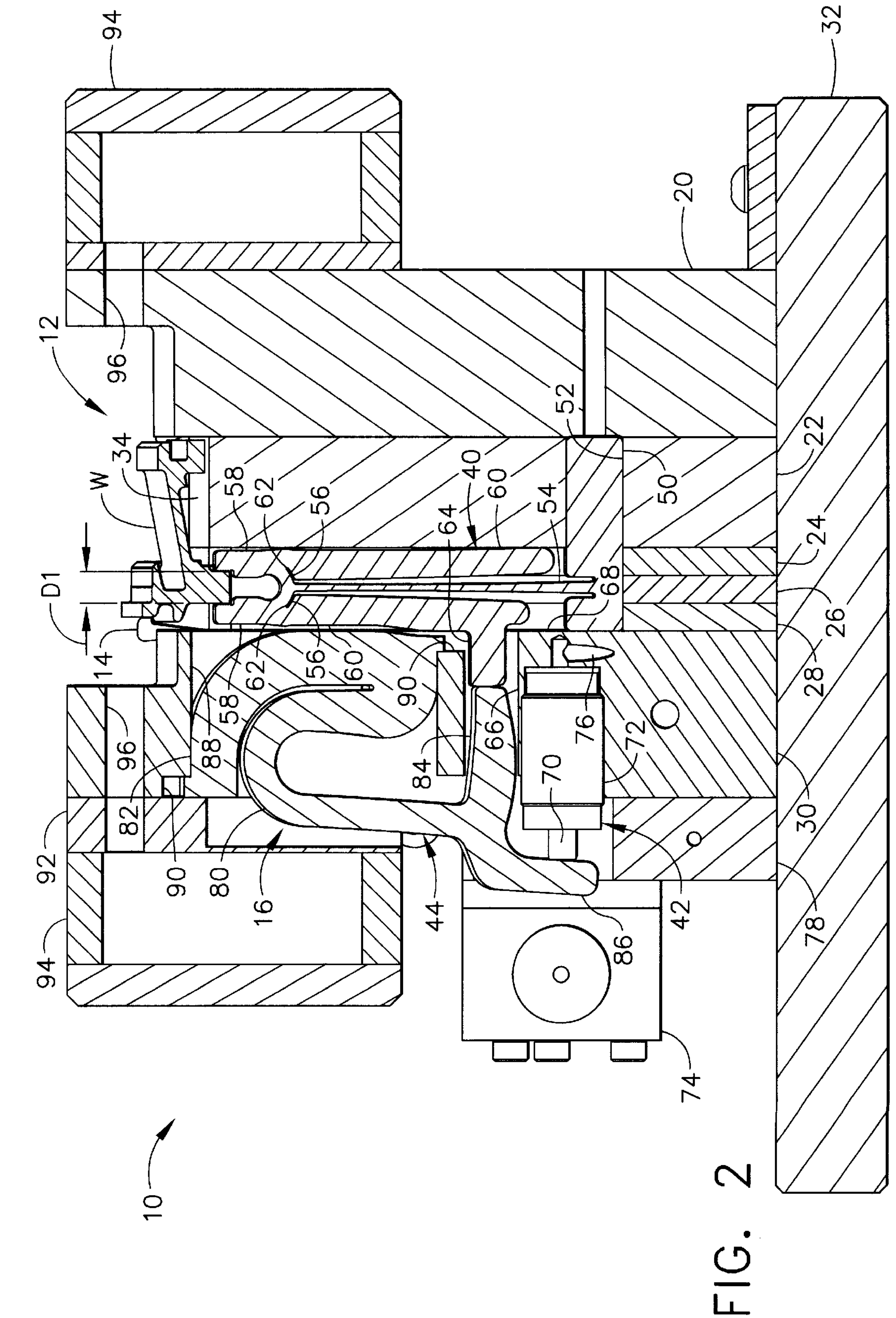
FIG. 2 is a vertical cross section similar to FIG. 1 but showing the jaws in a closed position bracing a workpiece.

The support 12 is formed by a series of vertically oriented plates 20, 22, 24, 26, 28, 30 positioned face to face to form a laminated structure. The plates 20–30 are held together and mounted on a base plate 32 by fasteners (not shown) in a conventional manner. A surface 34 is formed by the upper ends of the central plates 22–28 for receiving a workpiece W (FIG. 2). The surface 34 includes a reference point 36 which is slightly raised for locating and orienting the workpiece in a predetermined position. The clamp 14 holds the workpiece W in a fixed position with respect to (e.g., against) the reference point 36. The clamp 14 is driven from the position shown in FIG. 1 to the position shown in FIG. 2 by a conventional actuation system (not shown). Although fewer or more clamps 14 and reference points 36 may be used without departing from the scope of the present invention, the fixture 10 of the preferred embodiment has three clamps 14 and three reference points 36. (Only one clamp and one reference point are visible in FIG. 1.) Although the surface may have other shapes without departing from the scope of the present invention, the surface 34 of the preferred embodiment is generally arcuate and stepped to accommodate a specific workpiece W, namely an aircraft engine shroud hanger casting, in a position for grinding lands on its outer diameter surfaces. Regardless of the specific configuration, the surface 34 is sized and shaped for receiving the workpiece W to support the workpiece in a desired location and orientation for performing a particular manufacturing operation. Although six plates are used to form the support 12 of the preferred embodiment, fewer or more plates may be used without departing from the scope of the present invention. More than one plate is used to form the support 12 so the interior features of the support may be machined. Although the support may be made of other materials without departing from the scope of the present invention, the support 12 of the preferred embodiment is made of tool steel. Other features of the support 12 are well known by those skilled in the art and will not be described in further detail.

The bracing system 16 includes a brace (generally designated by 40), an actuator (generally designated by 42) and a mechanism (generally designated by 44) operatively connected between the brace and the actuator. The brace 40 has a base 50 which is received in a rectangular hole 52 in the plate 22 to radially (i.e., vertically as shown) and tangentially (i.e., normal to the page as shown) align the brace with the arcuate surface 34 of the support 12. As illustrated in FIG. 1, the base 50 has a length approximately equal to the combined thicknesses of plates 22–28 so the brace is held in place between the outer plates 20, 30 and axially aligned with the arcuate surface 34. An elongate flexible beam 54 extends vertically upward from the base 50 to a pair of integrally formed, resiliently flexible hinges 56 which extend outward from the beam. A jaw 58 is formed at the outer end of each hinge 56, and a lever 60 extends down from each jaw for providing leverage when moving the jaws between a closed position as shown in FIG. 2 and an open position as shown in FIG. 1. A narrow slot 62 is provided between each hinge 56 and the adjacent lever 60 for permitting the hinge to flex as the lever moves. The resilient hinges 56 bias the jaws 58 toward the closed position (FIG. 2) so the jaws 58 clamp the workpiece W when received by the support 12 to prevent the workpiece from moving toward or away from the support. The jaws 58 include serrations for preventing the workpiece W from moving relative to the jaws when in the closed position.

One of the levers 60 includes an extension 64 which extends into a hole 66 in the outer plate 30 for engaging the mechanism 44 as will be explained below. Slots 68 are formed in the plates 24–28 for accommodating the brace 40 so the upper ends of the jaws 58 protrude above the surface 34 of the support 12 for gripping a predetermined portion of the workpiece W.

Although the brace may be made of other materials without departing from the scope of the present invention, the brace 40 of the preferred embodiment is made of hardened tool steel. Further, although the brace may be made from more than one piece of material without departing from the scope of the present invention, the brace 40 of the preferred embodiment is machined from one piece of material. Moreover, the configuration of the brace 40 may vary from that shown in the drawings without departing from the scope of the present invention provided the brace does not deform the workpiece.

When in the closed position as shown in FIG. 2, the jaws 56 are spaced apart a first distance D1 sufficiently small to grip the workpiece W to prevent movement of the workpiece away from the support 12. When in the open position as shown in FIG. 1, the jaws 56 are spaced apart a second distance D2 which is larger than the first distance D1. The second distance D2 is sufficiently large to release the workpiece W and permit the workpiece to be removed from the support 12.

The beam 54 mounting the brace 40 to the support 12 is oriented generally normal to the surface 34 on the support. The beam flexes laterally to permit the brace to move generally parallel to the surface. This parallel movement permits the brace 40 to align itself to the workpiece W as the jaws move from their open position to their closed position to compensate for geometric variation in the workpiece. Thus, the beam 54 does not deform a workpiece W having dimensions which vary from nominal. However, the beam 54 prevents the brace 40 from moving substantially normal to the surface 34 of the support 12 so it prevents the workpiece from moving toward or away from the surface when the brace is in the closed position. Thus, the beam 54 prevents the brace 40 from moving the workpiece W out of the predetermined location and orientation on the support 12.

Although other types of actuators may be used without departing from the scope of the present invention, the actuator 42 of the preferred embodiment comprises a hydraulically actuated piston 70 and cylinder 72 which are controlled in a conventional manner by a hydraulic sequencing valve 74. The piston 70 operates between a retracted position as shown in FIG. 1 and an extended position as shown in FIG. 2. The piston 70 is operatively connected to the jaws 58 of the brace 40 so the jaws are in the open position when the piston is in the retracted position and in the closed position when the piston is in the extended position. Interior passaging 76 (only partially shown) in the support 12 provides hydraulic fluid to the actuator 42. A mounting plate 78 positioned on the base plate 32 adjacent the outer plate 30 mounts the sequencing valve 74 on the fixture 10.

The mechanism 44 connecting the actuator 42 and the brace 40 comprises a U-shaped spring 80 disposed between a curved mount 82 and a finger 84 which engages the extension 64 extending from one lever 60 of the brace 40. The mechanism 44 also includes an arm 86 which is engageable by the piston 70 for moving the brace 40 from the open position to the closed position when the piston moves from the retracted position to the extended position. The spring 80 biases the brace 40 toward the open position so the jaws 58 are open when the actuator 42 is not pressurized (i.e., when the piston is retracted.) Thus, the workpiece W can be positioned on the surface 34 of the support 12 and removed from the surface when hydraulic fluid is drained from the fixture 10 for unscheduled maintenance. The curved mount 82 and a portion of the spring 80 are positioned in a slot 88 machined in the outer plate 30, and the ends of the mount are received in recesses 90 provided in the plate 30 to hold the entire mechanism 44 in position. Although the mechanism may be made in more than one piece and from other materials, the mechanism 44 of the preferred embodiment is machined from one piece of hardened tool steel. A cover plate 92 is provided on the outer plate 30 to cover the mechanism 44 and protect it from damage. Manifolds 94 are mounted at each end of the fixture 10 for distributing cooling fluid to passages 96 in the cover plate 92 and outer plates 20, 30. These passages 96 direct fluid over the workpiece W as it is machined to cool the workpiece and flush debris away from the workpiece. Although only one bracing system 16 is shown, the fixture 10 of the preferred embodiment has two bracing systems for securely holding the workpiece W in position on the surface 34. Further, the fixture 10 may have more than two bracing systems without departing from the scope of the present invention.

To use the fixture 10, the piston 70 is retracted to the position shown in FIG. 1 so the jaws 58 of the brace 40 are open to receive a workpiece W which is loaded into the fixture 10 so it is positioned with respect to the reference points 36 of the surface 34. Once the workpiece is in position, the clamps 14 are actuated to hold the workpiece W in position with respect to the reference points 36. After the workpiece W is clamped in position, the brace actuator 42 is pressurized to move the piston 70 toward the extended position. As the piston 70 extends, it engages the arm 86 on the mechanism 44. As the piston 70 extends farther, it overcomes the spring 80 which holds the brace 40 open so the brace closes and the jaws 58 clamp the workpiece W in position on the fixture 10. Once the desired manufacturing operation is complete, the piston 70 is retracted to allow the spring 80 to compress the levers 60 and open the jaws 58 of the brace 40, following which the clamps 14 are released so the workpiece W can be removed from the fixture 10.

As will be understood by those skilled in the art, the fixture 10 of the present invention firmly holds a workpiece W in a predetermined location and orientation for performing a manufacturing operation. Further, the fixture 10 does not deform the workpiece or permit it to move out of position. Still further, the fixture 10 accommodates variations in the workpiece W size and shape without affecting the fixture performance.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A fixture for holding a workpiece in a predetermined position during a manufacturing operation, said fixture comprising:

a support having a surface sized and shaped for receiving the workpiece during the manufacturing operation, said surface having a reference point for locating and orienting the workpiece in the predetermined position;

a clamp mounted on the support for clamping the workpiece in a fixed position with respect to the reference point to hold the workpiece in the predetermined position; and a brace mounted on the support for bracing the workpiece to prevent the workpiece from deforming during the manufacturing operation, said brace having at least two jaws adapted for clamping the workpiece when received by the support to prevent movement of the workpiece toward or away from the support, said jaws having a closed position in which the jaws are spaced apart a first distance sufficiently small to grip the workpiece and an open position in which the jaws are spaced apart a second distance larger than said first distance sufficiently large to release the workpiece to permit the workpiece to be removed from the support, said brace being mounted on the support so as to permit at least one of the jaws to move generally parallel to the surface when moving from the open position to the closed position to compensate for geometric variation in the workpiece thereby permitting the brace to align itself to the workpiece and preventing the brace from moving the workpiece out of the predetermined position when the workpiece is clamped against the reference point and so as to prevent the jaws from moving substantially normal to the surface to prevent the workpiece from moving toward or away from the support when the jaws are in the closed position.

2. A fixture as set forth in claim 1 wherein said jaws are biased toward said open position.

3. A fixture as set forth in claim 2 further comprising an actuator operatively connected to the jaws for moving the jaws between the open position and the closed position.

4. A fixture as set forth in claim 3 wherein the actuator is a hydraulically actuated piston and cylinder, the piston being operable between an extended position and a retracted position relative to the cylinder.

5. A fixture as set forth in claim 4 wherein the piston is operatively connected to the jaws so that the jaws are in the open position when the piston is in the retracted position and the jaws are in the closed position when the piston is in the extended position.

6. A fixture as set forth in claim 3 further comprising a mechanism operatively connected between the actuator and the jaws for transmitting motion from the actuator to the jaws.

7. A fixture as set forth in claim 6 wherein the mechanism includes a spring for biasing the jaws toward the open position.

8. A fixture as set forth in claim 1 further comprising an elongate flexible beam connecting the jaws to the support, the beam being oriented generally normal to said surface on the support so that the beam flexes to permit the jaws to move generally parallel to the surface when moving from the open position to the closed position thereby permitting the brace to align itself to the workpiece and to prevent the jaws from moving substantially normal to the surface thereby preventing the workpiece from moving toward or away from the support when the jaws are in the closed position.

9. A fixture as set forth in claim 8 wherein the brace further comprises flexibly resilient hinges attaching the jaws to the beam.

10. A fixture as set forth in claim 9 wherein the brace further comprises at least two levers, each of said levers being operatively connected to one of said jaws for providing leverage to move the jaws between the closed position and the open position.

11. A fixture as set forth in claim 1 wherein the jaws include serrations for preventing relative movement between the jaws and the workpiece when the jaws are in the closed position.

* * * * *